US012447562B2

(12) United States Patent
Zinn et al.

(10) Patent No.: US 12,447,562 B2
(45) Date of Patent: Oct. 21, 2025

(54) NANOPARTICLE PASTE COMPOSITIONS AND CONNECTIONS FORMED THEREFROM

(71) Applicants: Kuprion Inc., San Jose, CA (US); Lockheed Martin Corporation, Bethesda, MD (US)

(72) Inventors: Alfred A. Zinn, Palo Alto, CA (US); Randall M. Stoltenberg, Palo Alto, CA (US)

(73) Assignee: Kuprion Inc., Waterbury, CT (US)

( * ) Notice: Subject to any disclaimer, the term of this patent is extended or adjusted under 35 U.S.C. 154(b) by 772 days.

(21) Appl. No.: 17/250,596

(22) PCT Filed: Aug. 8, 2019

(86) PCT No.: PCT/US2019/045633
§ 371 (c)(1),
(2) Date: Feb. 8, 2021

(87) PCT Pub. No.: WO2020/033631
PCT Pub. Date: Feb. 13, 2020

(65) Prior Publication Data
US 2021/0308807 A1    Oct. 7, 2021

Related U.S. Application Data

(60) Provisional application No. 62/715,911, filed on Aug. 8, 2018.

(51) Int. Cl.
*B23K 35/02*     (2006.01)
*B22F 1/054*     (2022.01)
(Continued)

(52) U.S. Cl.
CPC .......... *B23K 35/0244* (2013.01); *B22F 1/054* (2022.01); *B23K 35/025* (2013.01);
(Continued)

(58) Field of Classification Search
CPC . B22F 1/054; B23K 2103/12; B23K 35/0244; B23K 35/025; B23K 35/302; C22C 1/0425; C22C 1/05; C22C 32/0047
See application file for complete search history.

(56) References Cited

U.S. PATENT DOCUMENTS 7,736,414 B1   6/2010   Zinn
8,105,414 B2   1/2012   Zinn
(Continued)

FOREIGN PATENT DOCUMENTS

CN   103056544   *   4/2013
CN   105057911   *   11/2015
(Continued)

OTHER PUBLICATIONS

Tang, Y. et al. "Effect of Mn Nanoparticles on Interfacial Intermetallic Compound Growth in Low-Ag Sn-0.3Ag-0.7Cu-xMn Solder Joints." 2018. Soldering and surface mount technology. 30. 3. p. 153-163. (Year: 2018).*

(Continued)

*Primary Examiner* — Nicholas A Wang
(74) *Attorney, Agent, or Firm* — Carmody Torrance Sandak & Hennessey LLP

(57) ABSTRACT

Copper nanoparticle paste compositions may be formulated for forming connections that are capable of operating at high temperatures by including a grain growth inhibitor with copper nanoparticles in a suitable amount. Such nanoparticle paste compositions may comprise copper nanoparticles and 0.01-15 wt. % of a grain growth inhibitor or a precursor to a grain growth inhibitor admixed with the copper nanoparticles, in which the grain growth inhibitor comprises a metal. The grain growth inhibitor is insoluble in a bulk copper matrix and is capable of residing at one or more grain boundaries in the bulk copper matrix. The one or more grain boundaries may be formed after the copper nanoparticles (Continued)

undergo consolidation to form bulk copper. The grain growth inhibitor may comprise various metals that are insoluble in bulk copper.

15 Claims, 3 Drawing Sheets

(51) Int. Cl.
*B23K 35/30* (2006.01)
*B22F 1/08* (2022.01)
*B23K 103/12* (2006.01)

(52) U.S. Cl.
CPC .............. *B23K 35/302* (2013.01); *B22F 1/08* (2022.01); *B23K 2103/12* (2018.08)

(56) References Cited

U.S. PATENT DOCUMENTS

| | | |
|---|---|---|
| 8,192,866 B2 | 6/2012 | Golightly et al. |
| 8,486,305 B2 | 7/2013 | Zinn et al. |
| 8,834,747 B2 | 9/2014 | Zinn |
| 9,005,483 B2 | 4/2015 | Zinn et al. |
| 9,095,898 B2 | 8/2015 | Zinn |
| 9,700,940 B2 | 7/2017 | Zinn |
| 9,797,032 B2 | 10/2017 | Bedworth et al. |
| 9,881,895 B2 | 1/2018 | Stoltenberg et al. |
| 9,976,042 B2 | 5/2018 | Lee et al. |
| 2013/0209692 A1* | 8/2013 | Zinn .................. H01B 1/22 427/376.6 |
| 2013/0250481 A1 | 9/2013 | Sekine et al. |
| 2014/0134350 A1 | 5/2014 | Zinn |

FOREIGN PATENT DOCUMENTS

| | | |
|---|---|---|
| JP | 2012021193 | 2/2012 |
| KR | 10-1697097 | 1/2017 |
| WO | WO2017200361 | * 11/2017 |

OTHER PUBLICATIONS

Tan, A. et al. "Influence of nanoparticle addition on the formation and growth of intermetallic compounds (IMCs) in Cu/Sn-Ag-Cu/Cu solder joint during different thermal conditions." 2015. Sci. Technol. Adv. Mater. 16. p. 1-18 (Year: 2015).*

Ashayer, R. et al. "Nanoparticle Enhanced Solders for High Temperature Environments." 2007. 9th Electronics packaging technology conference. p. 109-113. (Year: 2007).*

Zhang, L. et al. "Structure and properties of lead-free solders bearing micro and nano particles." 2014. Materials science and engineering R. 82. p. 1-32. (Year: 2014).*

Sule, R. et al. "Synthesis and characterization of sub-micron sized copper-ruthenium-tantalum composites for interconnection application." 2012. Microelectronics reliability. 52. 1690-1698. (Year: 2012).*

International Search Report and Written Opinion for PCT/US2019/045633 dated Nov. 27, 2019.

* cited by examiner

AuSn solder      nCu adhesive

NANOPARTICLE PASTE COMPOSITIONS AND CONNECTIONS FORMED THEREFROM

BACKGROUND

Some of the most challenging missions in space, particularly those facing extreme heat, such as Venus landers and solar observatories, require more robust electronics systems than are currently available. Modern commercial electronics are designed to operate in a relatively narrow temperature range, typically within a range of approximately 0-100° C. Electronics may be survivable in some harsher environments with improved packaging and heat management, but these techniques oftentimes lead to greater design complexity and do not always address specific mission needs. For example, one proposed approach for a next-generation survivable Venus lander (462° C. surface temperature) is to build a large refrigerator for the electronics system. However, this approach is not readily scalable as the refrigerator may quickly consume all of the available system mass, leaving little room for scientific payloads. Similar challenges with high-temperature operating environments are also found closer to home in industries such as, for example, oil and gas exploration and production, high-power electric vehicle operation, mining, data storage, and energy production. All of these industries may have the need to utilize electronics that are survivable at high temperatures, such as temperature conditions exceeding 150° C., and sometimes exceeding 300° C. As another non-limiting example, with data centers becoming ever larger due to the proliferation of information technology and the IoT (Internet of Things), a limiting factor in their use is effective heat dissipation and cooling, which may expend more than their available energy budget, not to mention the harsh thermal environment associated therewith. Being able to run server blades efficiently at higher operating temperatures would reduce cooling requirements and produce significant energy savings, thereby allowing more of the energy budget to be used for data processing rather than for cooling. Current materials largely fail to meet these needs, however.

New classes of integrated circuit devices made from materials such as silicon carbide, gallium nitride, and diamond have emerged in recent years. More experimental systems based upon carbon nanotubes and graphene are under study, but these materials suffer from large-scale manufacturing issues and high-level integration challenges. The above materials are capable of operating at temperatures ranging from 300-700° C., thereby opening the door not only to Venus landers and close proximity solar missions, but also to the large commercial markets in which harsh thermal conditions must be addressed. Complementary passive devices and robust substrates have also been developed to better handle the high temperatures in these and other working environments.

Higher operating temperatures for electronic devices have revealed packaging materials to be a new limiting factor, however. Packaging materials include those components used for fabricating a device, such as solders for connecting electronic or structural components to one another. Typical solders melt and reflow near 200° C., while high-performance solders may melt and reflow at temperatures near 300° C. Even with high-performance solders, this still leaves a large gap between the desired maximum operating temperature of an integrated circuit and the temperature at which the solder reflows. Even below the reflow temperature, various solders may exhibit behaviors that can weaken or destroy joints through creep, intermetallic formation, and/or dendritic growth, each of which may accelerate with increasing temperature, even far below the reflow temperature or melting point. Many conventional solders also suffer from poor thermal conductivity, which becomes an even greater issue at elevated operating temperatures.

Sintered silvers and silver epoxies are currently used in some higher-temperature applications to address the foregoing issues associated with poor solder performance. In the epoxy case, thermal conductivity is extremely poor (less than 1 W/m·K), and the ultimate temperature survivability is limited, both of which may be attributed to a high polymer content. Furthermore, outgassing of an epoxy at high temperatures may lead to mechanical failure through delamination and contamination of other surfaces with the outgassed material. Silver also tends to exhibit undesirable electromigration, creep and dendritic growth during high-temperature operations, all of which are commonly observed with sintered silver products.

Gold-tin and gold-germanium eutectic alloys have been implemented as high-temperature brazes (reflow temperatures of 280° C. and 356° C., respectively), but their high cost makes widespread adoption cost-prohibitive. Even so, their reflow temperatures are still far too low for effective use in many high-temperature applications. At the opposite end of the thermal spectrum, silver-copper alloys having reflow temperatures in the 700-800° C. range are available. However, these reflow temperatures are on the upper end of the thermal stability range for even high-temperature electronic devices, thereby making device fabrication problematic and narrowing applicability of these packaging materials.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1:
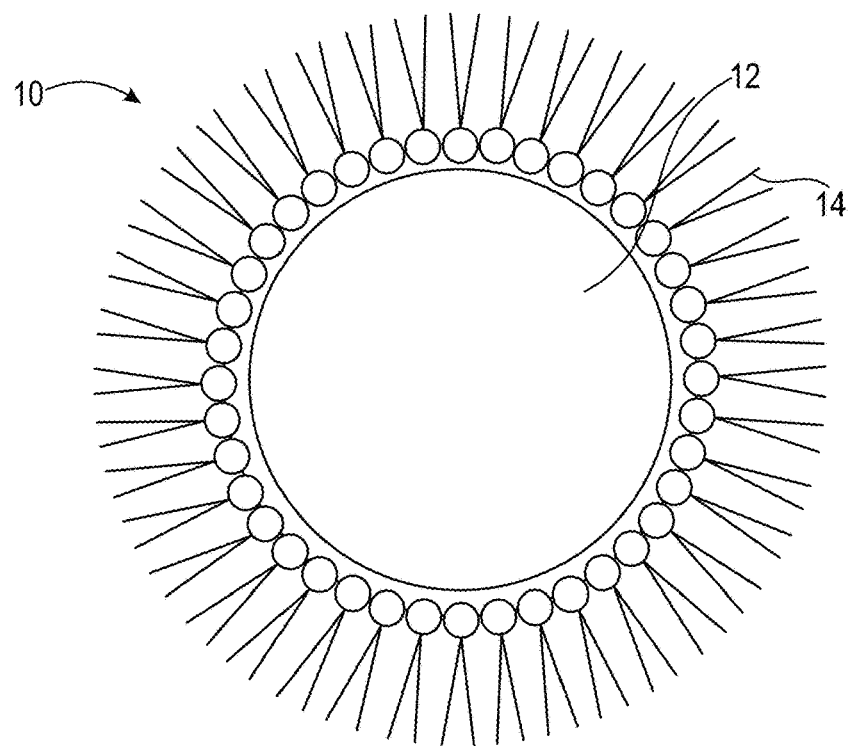
FIGS. 1 and 2 show diagrams of presumed structures of metal nanoparticles having a surfactant coating thereon.

The present disclosure is generally directed to high-temperature solders and, more specifically, copper-based solders for high-temperature electronics and methods for production and use thereof.

As discussed above, most modern electronics are designed to operate in a relatively narrow temperature range of approximately 0-100° C. Some harsher operating environments with increased thermal demands may be survivable with improved packaging and heat management, but limitations in device fabrication and performance still remain. Beyond about 150° C., common Si-based electronics begin to break down. SiC-based integrated circuits capable of operating near 600° C. have been developed, but these operating temperatures present a packaging challenge for current solder materials. Even high-performance solders reflow or begin to experience failure around 300° C., which leaves a large gap between the maximum operating temperature of a high-temperature integrated circuit and the temperature at which a solder can still function reliably. Moreover, high-performance solders are often expensive, and some may be incompatible with other materials used within an integrated circuit.

The present disclosure provides unconventional solder materials (metal adhesives) in the form of nanoparticle paste compositions and electronics assemblies comprising one or more connections formed from the nanoparticle paste compositions, each having good resistance to high-temperature operating conditions. Advantageously, the nanoparticle paste compositions may be processed at relatively low temperatures (~200-240° C. or below) to form a connection and maintain excellent connectivity and conductivity at high operating temperatures above 300° C. and even higher, up to about 900° C. or up to about 940° C., including temperatures in between. Instead of using a conventional reflowable solder to form a connection, the present disclosure employs a copper nanoparticle (nanocopper)-based material in the form of a nanoparticle paste composition, which may be processed at relatively low temperatures (~200° C., ~220° C. or ~240° C.) to form a connection comprising a bulk copper matrix. That is, the nanoparticle paste compositions disclosed herein do not require processing (reflow) at temperatures approaching the melting point of bulk copper in order to form a connection. Once a connection comprising a bulk copper matrix has been formed at a low processing temperature, the connection may be reliably operated at high temperatures in the range of about 150-900° C., particularly 300-900° C. As explained hereinafter, the low-temperature processing of copper nanoparticles to form a bulk copper matrix results from the heightened activity of the nanoparticles relative to the corresponding bulk metal, thereby allowing processing to take place well below the high melting point of bulk copper (1084° C.). In particular, copper nanoparticles fuse together at a temperature much lower than the melting point of bulk copper, thereby facilitating low-temperature fabrication conditions that are compatible with a range of electronic materials suitable for forming integrated circuits. Once fusion to form a bulk copper matrix has taken place, the resulting connector offers ready high-temperature compatibility up to a significant fraction of the melting point of bulk copper metal. Thus, use of copper nanoparticles to form a connection offers dual advantages of low-temperature fabrication conditions in combination with compatibility with high-temperature operating conditions. The combination of low-temperature processing and high-temperature compatibility is not possible with conventional solder materials.

Copper may be a desirable material for forming metallic connections within an electronic device intended for high-temperature operating conditions due to its having the highest melting point (1084° C.) of the three most conductive metals (coining metals) Cu, Ag, Au and the second highest electrical conductivity ($5.96 \times 10^7$ S/m vs Ag at $6.3 \times 10^7$) of these metals. Copper is also the toughest of these three metals, does not creep, and exhibits 7 times higher electrical conductivity compared to conventional solder materials (typically below $1 \times 10^7$ S/m). These properties exceed performance characteristics of even high-temperature AuSn alloy solder (283° C. m.p.) and various high-temperature, high-lead alloys used for die attachment and similar packing applications. Lead-based solders are being phased out worldwide due to RoHS regulations, thereby limiting their use to very specific applications for which no other solder material with suitable characteristics exists. In addition, few high-temperature solders are available in paste form, which limits their processibility and the available application space. As such, copper nanoparticle-based solders in the form of a nanoparticle paste composition provide a number of processing and operational advantages that are unmet by conventional solder materials.

Even below the melting point of bulk copper, a bulk copper matrix may undergo grain growth, particularly with repeated thermal cycling. Excessive grain growth may lead to structural weakening and failure of the connection. At low operating temperatures, grain growth is not typically a pressing operational concern for copper nanoparticle-based solders. Advantageously, the present disclosure describes how grain growth inhibitors may be combined with copper nanoparticles in a nanoparticle paste composition to lessen the occurrence of grain growth once a bulk copper matrix has been formed, while keeping the effective operational temperature of the bulk copper matrix as near as possible to the melting point of bulk copper. As such, inclusion of a grain growth inhibitor may increase the high-temperature reliability of a connection made from copper nanoparticles.

According to the present disclosure, a grain growth inhibitor, such as a metal (e.g., Al, Ti, Ta, Zr, or Hf) or other material that is insoluble in the bulk copper matrix, may be included in a suitable form with the copper nanoparticles to inhibit grain growth at elevated operational temperatures. In particular, grain growth may be inhibited by the grain growth inhibitor migrating to and residing at the grain boundaries that are present within the bulk copper matrix, thereby effectively locking the grain boundary in place. This process may be referred to as grain boundary pinning or Zener pinning. Processing conditions may dictate whether incorporation of an insoluble material at the grain growth boundaries occurs. Some metals, for example, may be soluble or insoluble in copper depending on the processing conditions and amounts used, as well as the form in which the metal is combined with the copper nanoparticles.

Before discussing the embodiments of the present disclosure in further detail, a brief description of metal nanoparticles and metal nanoparticle paste compositions suitable for use in the present disclosure will first be provided, with copper nanoparticles being a representative example of metal nanoparticles that may be present as a majority metal nanoparticle in the metal nanoparticle paste compositions. Metal nanoparticles exhibit a number of properties that can differ significantly from those of the corresponding bulk metal. One property of metal nanoparticles that can be of particular importance is nanoparticle fusion or consolidation that occurs at the metal nanoparticles' fusion temperature. As used herein, the term "fusion temperature" refers to the temperature at which a metal nanoparticle liquefies, thereby giving the appearance of melting. As used herein, the terms "fusion" and "consolidation" synonymously refer to the coalescence or partial coalescence of metal nanoparticles with one another to form a larger mass (sintered mass) of bulk metal, thereby defining a bulk metal matrix, such as a bulk copper matrix.

Upon decreasing in size, particularly below about 20 nm in equivalent spherical diameter, the temperature at which metal nanoparticles liquefy drops dramatically from that of the corresponding bulk metal. For example, copper nanoparticles having a size of about 20 nm or less or about 70 nm or less can have fusion temperatures of about 240° C. or below, or about 220° C. or below, or about 200° C. or below, in comparison to bulk copper's melting point of 1084° C.

Thus, the consolidation of metal nanoparticles taking place at the fusion temperature can allow objects containing a bulk metal matrix to be fabricated at significantly lower processing temperatures than when working directly with the bulk metal itself as a starting material. Once the bulk metal matrix has been formed, the melting point of the bulk metal matrix resembles that of the bulk metal and contains a plurality of grain boundaries.

As used herein, the term "metal nanoparticle" refers to metal particles that are about 100 nm or less in size, without particular reference to the shape of the metal particles. As used herein, the term "copper nanoparticle" refers to a metal nanoparticle made from copper or predominantly copper.

As used herein, the term "micron-scale metal particles" refers to metal particles that are about 100 nm or greater in size in at least one dimension.

The terms "consolidate," "consolidation" and other variants thereof are used interchangeably herein with the terms "fuse," "fusion" and other variants thereof.

As used herein, the terms "partially fused," "partial fusion," and other derivatives and grammatical equivalents thereof refer to the partial coalescence of metal nanoparticles with one another. Whereas totally fused metal nanoparticles retain essentially none of the structural morphology of the original unfused metal nanoparticles (i.e., they resemble bulk metal with minimal grain boundaries), partially fused metal nanoparticles retain at least some of the structural morphology of the original unfused metal nanoparticles. The properties of partially fused metal nanoparticles can be intermediate between those of the corresponding bulk metal and the original unfused metal nanoparticles.

A number of scalable processes for producing bulk quantities of metal nanoparticles in a targeted size range have been developed. Most typically, such processes for producing metal nanoparticles take place by reducing a metal precursor in the presence of one or more surfactants. The metal nanoparticles can then be isolated and purified from the reaction mixture by common isolation techniques and processed into a paste composition, if desired.

Any suitable technique can be employed for forming the metal nanoparticles used in the nanoparticle paste compositions and processes described herein. Particularly facile metal nanoparticle fabrication techniques and uses thereof are described in U.S. Pat. Nos. 7,736,414, 8,105,414, 8,192,866, 8,486,305, 8,834,747, 9,005,483, 9,095,898, 9,700,940, 9,797,032, 9,881,895, and 9,976,042, each of which is incorporated herein by reference in its entirety. As described therein, metal nanoparticles can be fabricated in a narrow size range by reduction of a metal salt in a solvent in the presence of a suitable surfactant system, which can include one or more different surfactants. Further description of suitable surfactant systems follows below. Without being bound by any theory or mechanism, it is believed that the surfactant system can mediate the nucleation and growth of the metal nanoparticles, limit surface oxidation of the metal nanoparticles, and/or inhibit metal nanoparticles from extensively aggregating with one another prior to being at least partially fused together. Suitable organic solvents for solubilizing metal salts and forming metal nanoparticles can include, for example, formamide, N,N-dimethylformamide, dimethyl sulfoxide, dimethylpropylene urea, hexamethylphosphoramide, tetrahydrofuran, and glyme, diglyme, triglyme, and tetraglyme. Reducing agents suitable for reducing metal salts and promoting the formation of metal nanoparticles can include, for example, an alkali metal in the presence of a suitable catalyst (e.g., lithium naphthalide, sodium naphthalide, or potassium naphthalide) or borohydride reducing agents (e.g., sodium borohydride, lithium borohydride, potassium borohydride, or tetraalkylammonium borohydrides).

Figure 2:
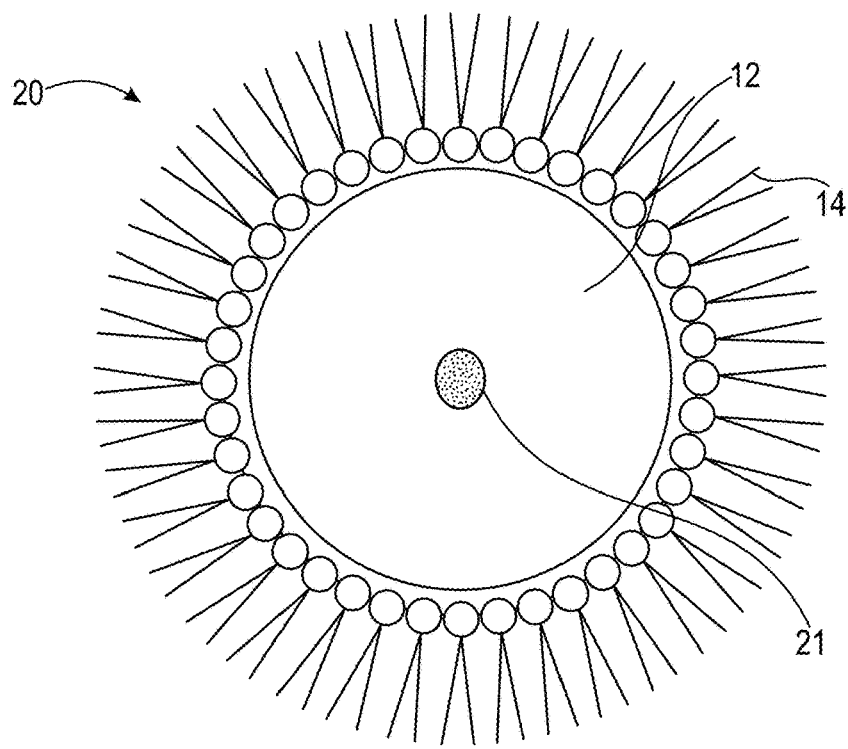

FIGS. 1 and 2 show diagrams of presumed structures of metal nanoparticles having a surfactant coating thereon. As shown in FIG. 1, metal nanoparticle 10 includes metallic core 12 and surfactant layer 14 overcoating metallic core 12. Surfactant layer 14 can contain any combination of surfactants, as described in more detail below. Metal nanoparticle 20, shown in FIG. 2, is similar to that depicted in FIG. 1, except metallic core 12 is grown about nucleus 21, which can be a metal that is the same as or different than that of metallic core 12. Because nucleus 21 is buried deep within metallic core 12 in metal nanoparticle 20, it is not believed to significantly affect the overall nanoparticle properties. In some embodiments, nucleus 21 may comprise a substance that is a grain growth inhibitor, which may be released into grain boundaries as the metal nanoparticles undergo consolidation with one another. In some embodiments, the nanoparticles can have an amorphous morphology.

As discussed above, the metal nanoparticles have a surfactant coating containing one or more surfactants upon their surface. The surfactant coating can be formed on the metal nanoparticles during their synthesis. The surfactant coating is generally lost during consolidation of the metal nanoparticles upon heating above the fusion temperature. Formation of a surfactant coating upon metal nanoparticles during their syntheses can desirably limit the ability of the metal nanoparticles to fuse to one another before heating above the fusion temperature, limit agglomeration of the metal nanoparticles, and promote the formation of a population of metal nanoparticles having a narrow size distribution.

Copper can be a particularly desirable metal in the embodiments of the present disclosure due to its low cost, strength, and excellent electrical and thermal conductivity values, as well as additional advantages addressed further herein. Although copper nanoparticles may be advantageous for use in the embodiments herein, it is to be appreciated that other types of metal nanoparticles may be used in alternative embodiments for forming a connection in the presence of a suitable grain growth inhibitor. Other metal nanoparticles that may be useful in high-temperature packaging applications include, for example, aluminum nanoparticles, palladium nanoparticles, silver nanoparticles, gold nanoparticles, iron nanoparticles, cobalt nanoparticles, nickel nanoparticles, titanium nanoparticles, zirconium nanoparticles, hafnium nanoparticles, tantalum nanoparticles, and the like. Micron-sized particles of these metals may be present in paste compositions containing the metal nanoparticles as well, which may provide processing advantages in some cases.

In various embodiments, the surfactant system present within the metal nanoparticles can include one or more surfactants. The differing properties of various surfactants can be used to tailor the properties of the metal nanoparticles. Factors that can be taken into account when selecting a surfactant or combination of surfactants for inclusion upon the metal nanoparticles can include, for example, ease of surfactant dissipation from the metal nanoparticles during nanoparticle fusion, nucleation and growth rates of the metal nanoparticles, the metal component of the metal nanoparticles, and the like.

In some embodiments, an amine surfactant or combination of amine surfactants, particularly aliphatic amines, can be present upon the metal nanoparticles. Amine surfactants can be particularly desirable for use in conjunction with copper nanoparticles. In some embodiments, two amine surfactants can be used in combination with one another. In other embodiments, three amine surfactants can be used in combination with one another. In more specific embodiments, a primary amine, a secondary amine, and a diamine chelating agent can be used in combination with one another. In still more specific embodiments, the three amine surfactants can include a long chain primary amine, a secondary amine, and a diamine having at least one tertiary alkyl group nitrogen substituent. Further disclosure regarding suitable amine surfactants follows hereinafter.

In some embodiments, the surfactant system can include a primary alkylamine. In some embodiments, the primary alkylamine can be a $C_2$-$C_{18}$ alkylamine. In some embodiments, the primary alkylamine can be a $C_7$-$C_{10}$ alkylamine. In other embodiments, a $C_5$-$C_6$ primary alkylamine can also be used. Without being bound by any theory or mechanism, the exact size of the primary alkylamine can be balanced between being long enough to provide an effective inverse micelle structure during synthesis versus having ready volatility and/or ease of handling during nanoparticle consolidation. For example, primary alkylamines with more than 18 carbons can also be suitable for use in the present embodiments, but they can be more difficult to handle because of their waxy character. $C_7$-$C_{10}$ primary alkylamines, in particular, can represent a good balance of desired properties for ease of use.

In some embodiments, the $C_2$-$C_{18}$ primary alkylamine can be n-hexylamine, n-heptylamine, n-octylamine, n-nonylamine, or n-decylamine, for example. While these are all straight chain primary alkylamines, branched chain primary alkylamines can also be used in other embodiments. For example, branched chain primary alkylamines such as, for example, 7-methyloctylamine, 2-methyloctylamine, or 7-methylnonylamine can be used. In some embodiments, such branched chain primary alkylamines can be sterically hindered where they are attached to the amine nitrogen atom. Non-limiting examples of such sterically hindered primary alkylamines can include, for example, t-octylamine, 2-methylpentan-2-amine, 2-methylhexan-2-amine, 2-methylheptan-2-amine, 3-ethyloctan-3-amine, 3-ethylheptan-3-amine, 3-ethylhexan-3-amine, and the like. Additional branching can also be present. Without being bound by any theory or mechanism, it is believed that primary alkylamines can serve as ligands in the metal coordination sphere but be readily dissociable therefrom during metal nanoparticle consolidation.

In some embodiments, the surfactant system can include a secondary amine. Secondary amines suitable for forming metal nanoparticles can include normal, branched, or cyclic $C_4$-$C_{12}$ alkyl groups bound to the amine nitrogen atom. In some embodiments, the branching can occur on a carbon atom bound to the amine nitrogen atom, thereby producing significant steric encumbrance at the nitrogen atom. Suitable secondary amines can include, without limitation, dihexylamine, diisobutylamine, di-t-butylamine, dineopentylamine, di-t-pentylamine, dicyclopentylamine, dicyclohexylamine, and the like. Secondary amines outside the $C_4$-$C_{12}$ range can also be used, but such secondary amines can have undesirable physical properties such as low boiling points or waxy consistencies that can complicate their handling.

In some embodiments, the surfactant system can include a chelating agent, particularly a diamine chelating agent. In some embodiments, one or both of the nitrogen atoms of the diamine chelating agent can be substituted with one or two alkyl groups. When two alkyl groups are present on the same nitrogen atom, they can be the same or different. Further, when both nitrogen atoms are substituted, the same or different alkyl groups can be present. In some embodiments, the alkyl groups can be $C_1$-$C_6$ alkyl groups. In other embodiments, the alkyl groups can be $C_1$-$C_4$ alkyl groups or $C_3$-$C_6$ alkyl groups. In some embodiments, $C_3$ or higher alkyl groups can be straight or have branched chains. In some embodiments, $C_3$ or higher alkyl groups can be cyclic. Without being bound by any theory or mechanism, it is believed that diamine chelating agents can facilitate metal nanoparticle formation by promoting nanoparticle nucleation.

In some embodiments, suitable diamine chelating agents can include N,N'-dialkylethylenediamines, particularly $C_1$-$C_4$ N,N'-dialkylethylenediamines. The corresponding methylenediamine, propylenediamine, butylenediamine, pentylenediamine or hexylenediamine derivatives can also be used. The alkyl groups can be the same or different. $C_1$-$C_4$ alkyl groups that can be present include, for example, methyl, ethyl, propyl, and butyl groups, or branched alkyl groups such as isopropyl, isobutyl, s-butyl, and t-butyl groups. Illustrative N,N'-dialkylethylenediamines that can be suitable for inclusion upon metal nanoparticles include, for example, N,N'-di-t-butylethylenediamine, N,N'-diisopropylethylenediamine, and the like.

In some embodiments, suitable diamine chelating agents can include N,N,N',N'-tetraalkylethylenediamines, particularly $C_1$-$C_4$ N,N,N',N'-tetraalkylethylenediamines. The corresponding methylenediamine, propylenediamine, butylenediamine, pentylenediamine or hexylenediamine derivatives can also be used. The alkyl groups can again be the same or different and include those mentioned above. Illustrative N,N,N',N'-tetraalkylethylenediamines that can be suitable for use in forming metal nanoparticles include, for example, N,N,N',N'-tetramethylethylenediamine, N,N,N',N'-tetraethylethylenediamine, and the like.

Surfactants other than aliphatic amines can also be present in the surfactant system. In this regard, suitable surfactants can include, for example, pyridines, aromatic amines, phosphines, thiols, or any combination thereof. These surfactants can be used in combination with an aliphatic amine, including those described above, or they can be used in a surfactant system in which an aliphatic amine is not present. Further disclosure regarding suitable pyridines, aromatic amines, phosphines, and thiols follows below.

Suitable aromatic amines can have a formula of $ArNR^1R^2$, where Ar is a substituted or unsubstituted aryl group and $R^1$ and $R^2$ are the same or different. $R^1$ and $R^2$ can be independently selected from H or an alkyl or aryl group containing from 1 to about 16 carbon atoms. Illustrative aromatic amines that can be suitable for use in forming metal nanoparticles include, for example, aniline, toluidine, anisidine, N,N-dimethylaniline, N,N-diethylaniline, and the like. Other aromatic amines that can be used in conjunction with metal nanoparticles can be envisioned by one having ordinary skill in the art.

Suitable pyridines can include both pyridine and its derivatives. Illustrative pyridines that can be suitable for use inclusion upon metal nanoparticles include, for example, pyridine, 2-methylpyridine, 2,6-dimethylpyridine, collidine, pyridazine, and the like. Chelating pyridines such as bipyridyl chelating agents may also be used. Other pyridines that can be used in conjunction with metal nanoparticles can be envisioned by one having ordinary skill in the art.

Suitable phosphines can have a formula of $PR_3$, where R is an alkyl or aryl group containing from 1 to about 16 carbon atoms. The alkyl or aryl groups attached to the phosphorus center can be the same or different. Illustrative phosphines that can be present upon metal nanoparticles include, for example, trimethylphosphine, triethylphosphine, tributylphosphine, tri-t-butylphosphine, trioctylphosphine, triphenylphosphine, and the like. Phosphine oxides can also be used in a like manner. In some embodiments, surfactants that contain two or more phosphine groups configured for forming a chelate ring can also be used. Illustrative chelating phosphines can include 1,2-bisphosphines, 1,3-bisphosphines, and bis-phosphines such as BINAP, for example. Other phosphines that can be used in conjunction with metal nanoparticles can be envisioned by one having ordinary skill in the art.

Suitable thiols can have a formula of RSH, where R is an alkyl or aryl group having from about 4 to about 16 carbon atoms. Illustrative thiols that can present upon metal nanoparticles include, for example, butanethiol, 2-methyl-2-propanethiol, hexanethiol, octanethiol, benzenethiol, and the like. In some embodiments, surfactants that contain two or more thiol groups configured for forming a chelate ring can also be used. Illustrative chelating thiols can include, for example, 1,2-dithiols (e.g., 1,2-ethanethiol) and 1,3-dithiols (e.g., 1,3-propanethiol). Other thiols that can be used in conjunction with metal nanoparticles can be envisioned by one having ordinary skill in the art.

The metal nanoparticles described hereinabove can be incorporated within various nanoparticle paste compositions, which may facilitate dispensation for forming a connection. Illustrative disclosure directed to such nanoparticle paste compositions follows hereinafter. Copper nanoparticle paste compositions may be particularly useful for forming a connection, as described herein, especially in the presence of a grain growth inhibitor, for connections that may be exposed to high operating temperatures, particularly with repeated thermal cycling.

Nanoparticle paste compositions can be prepared by dispersing as-produced or as-isolated metal nanoparticles in an organic matrix containing one or more organic solvents and various other optional components. As used herein, the terms "nanoparticle paste formulation" and "nanoparticle paste composition" are used interchangeably and refer synonymously to a fluid composition containing dispersed metal nanoparticles that is suitable for dispensation using a desired technique. Use of the term "paste" does not necessarily imply an adhesive function of the paste alone. Through judicious choice of the organic solvent(s) and other additives, the loading of metal nanoparticles and the like, dispensation of the metal nanoparticles in a desired location may be promoted. In addition, nanoparticle paste formulations, particularly those containing copper nanoparticles, may contain a grain growth inhibitor suitable to preclude grain growth once a bulk metal matrix has been formed and exposed to high operating temperatures.

Cracking and shrinkage can sometimes occur during consolidation of the metal nanoparticles. One way in which the nanoparticle paste compositions can promote a decreased degree of cracking and void formation following metal nanoparticle consolidation is by maintaining a high solids content. More particularly, in some embodiments, the paste compositions can contain at least about 30% metal nanoparticles by weight, particularly about 30% to about 97% metal nanoparticles by weight of the nanoparticle paste composition, or about 50% to about 97% metal nanoparticles by weight of the nanoparticle paste composition, or about 70% to about 97% metal nanoparticles by weight of the nanoparticle paste composition. Moreover, in some embodiments, small amounts (e.g., about 0.01% to about 15%, or about 35% to about 60%, or about 10% to about 35% by weight of the paste composition) of micron-scale metal particles can be present in addition to the metal nanoparticles. Such micron-scale metal particles can desirably promote the fusion of metal nanoparticles into a contiguous mass and further reduce the incidence of cracking and shrinkage. For example, shrinkage upon forming fused copper nanoparticles may decrease to about 5 vol. % or less in the presence of micron-scale particles as compared to shrinkage rates of about 20-30 vol. % when micron-scale particles are not present. Instead of being liquefied and undergoing direct consolidation, the micron-scale metal particles can simply become joined together upon being contacted with liquefied metal nanoparticles that have been raised above their fusion temperature. These factors can reduce the porosity after fusing the metal nanoparticles together. The micron-scale metal particles can contain the same or different metals than the metal nanoparticles. Suitable metals for the micron-scale particles can include, for example, copper, silver, gold, aluminum, tin, and the like. Micron-scale graphite particles may also be included, in some embodiments. Carbon nanotubes and/or graphene may be included, in some embodiments. Carbon black and/or nanocarbon may be included in still other embodiments. Still other additives, such as diamond particles and cubic BN (boron nitride) may be included as well.

Micron-scale metal particles may be differentiated from grain growth inhibitors in the disclosure herein, since micron-scale metal particles are less readily incorporated within grain boundaries between consolidated metal nanoparticles due to their relatively large size. Particular examples of grain growth inhibitors or precursors thereto suitable for use in the present disclosure are discussed in further detail hereinbelow.

Decreased cracking and void formation during metal nanoparticle consolidation can also be promoted by judicious choice of the solvent(s) forming the organic matrix. A tailored combination of organic solvents can desirably decrease the incidence of cracking and void formation. More particularly, an organic matrix containing one or more hydrocarbons (saturated, monounsaturated, polyunsaturated (2 or more double bonds) or aromatic), one or more alcohols, one or more amines, and one or more organic acids can be especially effective for this purpose. One or more esters and/or one or more anhydrides may be included, in some embodiments. Without being bound by any theory or mechanism, it is believed that this combination of organic solvents can facilitate the removal and sequestration of surfactant molecules surrounding the metal nanoparticles during consolidation, such that the metal nanoparticles can more easily fuse together with one another. More particularly, it is believed that hydrocarbon and alcohol solvents can passively solubilize surfactant molecules released from the metal nanoparticles by Brownian motion and reduce their ability to become re-attached thereto. In concert with the passive solubilization of surfactant molecules, amine and organic acid solvents can actively sequester the surfactant molecules through a chemical interaction such that they are no longer available for recombination with the metal nanoparticles.

Further tailoring of the solvent composition can be performed to reduce the suddenness of volume contraction that takes place during surfactant removal and metal nanoparticle consolidation. Specifically, more than one member of each class of organic solvent (i.e., hydrocarbons, alcohols, amines, and organic acids), can be present in the organic matrix, where the members of each class have boiling points that are separated from one another by a set degree. For example, in some embodiments, the various members of each class can have boiling points that are separated from one another by about 20° C. to about 50° C. By using such a solvent mixture, sudden volume changes due to rapid loss of solvent can be minimized during metal nanoparticle consolidation, since the various components of the solvent mixture can be removed gradually over a broad range of boiling points (e.g., about 50° C. to about 250° C.).

In some embodiments, at least some of the one or more organic solvents can have a boiling point of about 100° C. or greater. In some embodiments, at least some of the one or more organic solvents can have a boiling point of about 200° C. or greater or about 300° C. or greater. In some embodiments, the one or more organic solvents can have boiling points ranging between about 50° C. and about 200° C. Use of high boiling organic solvents can desirably increase the pot life of the nanoparticle paste compositions and limit the rapid loss of solvent, which can lead to cracking and void formation during nanoparticle consolidation. In some embodiments, at least one of the organic solvents can have a boiling point that is higher than the boiling point(s) of the surfactant(s) associated with the metal nanoparticles. Accordingly, surfactant(s) can be removed from the metal nanoparticles by evaporation before removal of the organic solvent(s) takes place.

In some embodiments, the organic matrix can contain one or more alcohols. In various embodiments, the alcohols can include monohydric alcohols, diols, triols, glycol ethers (e.g., diethylene glycol and triethylene glycol), alkanolamines (e.g., ethanolamine, triethanolamine, and the like), or any combination thereof. In some embodiments, one or more hydrocarbons can be present in combination with one or more alcohols. As discussed above, it is believed that alcohol and hydrocarbon solvents can passively promote the solubilization of surfactants as they are removed from the metal nanoparticles by Brownian motion and limit their re-association with the metal nanoparticles. Moreover, hydrocarbon and alcohol solvents only weakly coordinate with metal nanoparticles, so they do not simply replace the displaced surfactants in the nanoparticle coordination sphere. Illustrative but non-limiting examples of alcohol and hydrocarbon solvents that can be present include, for example, light aromatic petroleum distillate (CAS 64742-95-6), hydrotreated light petroleum distillates (CAS 64742-47-8), tripropyleneglycol methyl ether, ligroin (CAS 68551-17-7, a mixture of $C_{10}$-$C_{13}$ alkanes), diisopropyleneglycol monomethyl ether, diethyleneglycol diethyl ether, 2-propanol, 2-butanol, t-butanol, 1-hexanol, 2-(2-butoxyethoxy) ethanol, and terpineol. In some embodiments, polyketone solvents can be used in a like manner.

In some embodiments, the organic matrix can contain one or more amines and one or more organic acids. In some embodiments, the one or more amines and one or more organic acids can be present in an organic matrix that also includes one or more hydrocarbons and one or more alcohols. As discussed above, it is believed that amines and organic acids can actively sequester surfactants that have been passively solubilized by hydrocarbon and alcohol solvents, thereby making the surfactants unavailable for re-association with the metal nanoparticles. Thus, an organic solvent that contains a combination of one or more hydrocarbons, one or more alcohols, one or more amines, and one or more organic acids can provide synergistic benefits for promoting the consolidation of metal nanoparticles. Illustrative but non-limiting examples of amine solvents that can be present include, for example, tallowamine (CAS 61790-33-8), alkyl ($C_8$-$C_{18}$) unsaturated amines (CAS 68037-94-5), di(hydrogenated tallow)amine (CAS 61789-79-5), dialkyl ($C_8$-$C_{20}$) amines (CAS 68526-63-6), alkyl ($C_{10}$-$C_{16}$) dimethyl amine (CAS 67700-98-5), alkyl ($C_{14}$-$C_{18}$) dimethyl amine (CAS 68037-93-4), dihydrogenated tallowmethyl amine (CAS 61788-63-4), and trialkyl ($C_6$-$C_{12}$) amines (CAS 68038-01-7). Illustrative but non-limiting examples of organic acid solvents that can be present in the nanoparticle paste compositions include, for example, octanoic acid, nonanoic acid, decanoic acid, caprylic acid, pelargonic acid, undecylic acid, lauric acid, tridecylic acid, myristic acid, pentadecanoic acid, palmitic acid, margaric acid, stearic acid, nonadecylic acid, α-linolenic acid, stearidonic acid, oleic acid, and linoleic acid.

In some embodiments, the organic matrix can include more than one hydrocarbon, more than one alcohol, more than one amine, and more than one organic acid. For example, in some embodiments, each class of organic solvent can have two or more members, or three or more members, or four or more members, or five or more members, or six or more members, or seven or more members, or eight or more members, or nine or more members, or ten or more members. Moreover, the number of members in each class of organic solvent can be the same or different. Particular benefits of using multiple members of each class of organic solvent are described hereinafter.

One particular advantage of using multiple members within each class of organic solvent can include the ability to provide a wide spread of boiling points in the nanoparticle paste compositions. By providing a wide spread of boiling points, the organic solvents can be removed gradually as the temperature rises while affecting metal nanoparticle consolidation, thereby limiting volume contraction and disfavoring cracking. Greater structural integrity of a connection may be realized as a result. By gradually removing the organic solvent in this manner, less temperature control may be needed to promote slow solvent removal than if a single solvent with a narrow boiling point range was used. In some embodiments, the members within each class of organic solvent can have a window of boiling points ranging between about 50° C. and about 200° C., or between about 50° C. and about 250° C., or between about 100° C. and about 200° C., or between about 100° C. and about 250° C. Boiling points up to about 350° C. may be suitable in some cases. In more particular embodiments, the various members of each class of organic solvent can each have boiling points that are separated from one another by at least about 20° C., specifically about 20° C. to about 50° C. More specifically, in some embodiments, each hydrocarbon can have a boiling point that differs by about 20° C. to about 50° C. from other hydrocarbons in the organic matrix, each alcohol can have a boiling point that differs by about 20° C. to about 50° C. from other alcohols in the organic matrix, each amine can have a boiling point that differs by about 20° C. to about 50° C. from other amines in the organic matrix, and each organic acid can have a boiling point that differs by about 20° C. to about 50° C. from other organic acids in the organic matrix. The more members of each class of organic solvent that are present, the smaller the differences become between the boiling points. By having smaller differences between the boiling points, solvent removal can be made more continual, thereby limiting the degree of volume contraction that occurs at each stage. A reduced degree of cracking can occur when four to five or more members of each class of organic solvent are present (e.g., four or more hydrocarbons, four or more alcohols, four or more amines, and four or more organic acids; or five or more hydrocarbons, five or more alcohols, five or more amines, and five or more organic acids), each having boiling points that are separated from one another within the above range.

In various embodiments, the metal nanoparticles used in the nanoparticle paste compositions can be about 20 nm or less in size. In some embodiments, metal nanoparticles may be up to about 70 nm or 75 nm in size. As discussed above, metal nanoparticles in this size range have fusion temperatures that are significantly lower than those of the corresponding bulk metal and readily undergo consolidation with one another as a result. In some embodiments, metal nanoparticles that are about 20 nm or less or about 70 nm or less in size can have a fusion temperature of about 240° C. or below (e.g., a fusion temperature in the range of about 140° C. to about 240° C.), or about 220° C. or below, or about 200° C. or below, which can provide advantages that are noted above. In some embodiments, at least a portion of the metal nanoparticles can be about 10 nm or less in size, or about 5 nm or less in size. In some embodiments, at least a portion of the metal nanoparticles can range between about 1 nm in size to about 20 nm in size, or between about 1 nm in size and about 10 nm in size, or between about 1 nm in size to about 5 nm in size, or between about 3 nm in size to about 7 nm in size, or between about 5 nm in size to about 20 nm in size. In some embodiments, substantially all of the metal nanoparticles can reside within these size ranges. In some embodiments, larger metal nanoparticles can be combined in the nanoparticle paste compositions with metal nanoparticles that are about 20 nm in size or less. For example, in some embodiments, metal nanoparticles ranging from about 1 nm to about 10 nm in size can be combined with metal nanoparticles that range from about 25 nm to about 50 nm in size, or with metal nanoparticles that range from about 25 nm to about 100 nm in size. As further discussed below, micron-scale metal particles or nanoscale particles can also be included in the nanoparticle paste compositions in some embodiments. Although larger metal nanoparticles and micron-scale metal particles may not be liquefiable at the low temperatures of their smaller counterparts, they can still become consolidated upon contacting the smaller metal nanoparticles that have been liquefied at or above their fusion temperature, as generally discussed above. Larger metal nanoparticles and micro-scale metal particles need not necessarily be uniformly distributed to accomplish this function.

In addition to metal nanoparticles and organic solvents, other additives can also be present in the nanoparticle paste compositions. Such additional additives can include, for example, rheology control aids, thickening agents, micron-scale conductive additives, nanoscale conductive additives, and any combination thereof. Chemical additives can also be present. As discussed hereinafter, the inclusion of micron-scale conductive additives, such as micron-scale metal particles, can be particularly advantageous. Nanoscale or micron-scale diamond or other thermally conductive additives may be desirable to include in some instances.

In some embodiments, the nanoparticle paste compositions can contain about 0.01% to about 15% micron-scale metal particles by weight, or about 1% to about 10% micron-scale metal particles by weight, or about 1% to about 5% micron-scale metal particles by weight, or about 0.1% to about 35% micron-scale particles by weight, or about 10% to about 35% micron-scale particles by weight. Inclusion of micron-scale metal particles in the nanoparticle paste compositions can desirably reduce the incidence of cracking that occurs during consolidation of the metal nanoparticles when forming a contiguous metal trace. Without being bound by any theory or mechanism, it is believed that the micron-scale metal particles can become partially consolidated with one another as the metal nanoparticles are liquefied and form a transient liquid coating upon the micron-scale metal particles and filling voids therebetween. In essence, the metal nanoparticles function as a "glue" binding the micron-scale particles together. In some embodiments, the micron-scale metal particles can range between about 500 nm to about 100 microns in size in at least one dimension, or from about 500 nm to about 10 microns in size in at least one dimension, or from about 100 nm to about 5 microns in size in at least one dimension, or from about 100 nm to about 10 microns in size in at least one dimension, or from about 100 nm to about 1 micron in size in at least one dimension, or from about 1 micron to about 10 microns in size in at least one dimension, or from about 5 microns to about 10 microns in size in at least one dimension, or from about 1 micron to about 100 microns in size in at least one dimension. The micron-size metal particles can contain the same metal as the metal nanoparticles or contain a different metal. Thus, metal alloys can be fabricated by including micron-size metal particles in the nanoparticle paste compositions with a metal differing from that of the metal nanoparticles. Suitable micron-scale metal particles can include, for example, Cu, Ni, Al, Fe, Co, Mo, Ag, Zn, Sn, Au, Pd, Pt, Ru, Mn, Cr, Ti, V, Mg or Ca particles. Borides, carbides, phosphides, nitrides, and silicides of these metals, and combinations thereof may be used as well. Non-metal particles such as, for example, Si and B micron-scale particles can be used in a like manner. In some embodiments, the micron-scale metal particles can be in the form of metal flakes, such as high aspect ratio copper flakes, for example. That is, in some embodiments, the nanoparticle paste compositions described herein can contain a mixture of copper nanoparticles and high aspect ratio copper flakes. Specifically, in some embodiments, the paste compositions can contain about 30% to about 97% copper nanoparticles by weight and about 0.01% to about 15% high aspect ratio copper flakes by weight, or about 0.1% to about 35% high aspect ratio copper flakes by weight, or about 1% to about 35% high aspect ratio copper flakes by weight.

Other micron-scale metal particles that can be used equivalently to high aspect ratio metal flakes include, for example, metal nanowires and other high aspect ratio particles, which can be up to about 300 microns or about 500 microns in length. The ratio of metal nanoparticles to metal nanowires may range between about 10:1 to about 40:1, according to various embodiments. Suitable nanowires may have a length of between about 5 microns and about 50 microns or about 100 microns, and a diameter between about 100 nm and about 200 nm, for example.

In some embodiments, nanoscale conductive additives can also be present in the nanoparticle paste compositions. These additives can desirably provide further structural reinforcement and reduce shrinkage during metal nanoparticle consolidation. Moreover, inclusion of nanoscale conductive additives can increase electrical and thermal conductivity values that can approach or even exceed that of the corresponding bulk metal following nanoparticle consolidation. In some embodiments, the nanoscale conductive additives can have a size in at least one dimension ranging between about 1 micron and about 100 microns, or ranging between about 1 micron and about 300 microns. Suitable nanoscale conductive additives can include, for example, carbon nanotubes, graphene, and the like. When present, the nanoparticle paste compositions can contain about 1% to about 15% nanoscale conductive additives by weight, or about 1% to about 10% nanoscale conductive additives by weight, or about 1% to about 5% nanoscale conductive additives by weight.

Additional substances that can also optionally be present include, for example, flame retardants, UV protective agents, antioxidants, carbon black, graphite, fiber materials (e.g., chopped carbon fiber materials), diamond, and the like.

Nanoparticle paste compositions suitable for use in packaging applications according to the present disclosure can be formulated using any of the nanoparticle paste compositions described hereinabove, in which a grain growth inhibitor is further included, particularly a grain growth inhibitor comprising a metal. The grain growth inhibitor may be included in a suitable form such that the grain growth inhibitor is capable of entering grain boundaries following nanoparticle consolidation. If not included in a suitable form, ineffective grain growth inhibition may occur, even if the grain growth inhibitor otherwise comprises a substance that is capable of providing grain growth inhibition.

In particular embodiments, nanoparticle paste compositions suitable for use in the disclosure herein may comprise copper nanoparticles and a suitable amount of a grain growth inhibitor to prevent substantial grain growth upon heating a bulk copper matrix formed from the copper nanoparticles. The suitable amount of the grain growth inhibitor may range between from 0.01 wt. % to about 15 wt. % of the nanoparticle paste composition, according to various embodiments. Effective temperature ranges over which the grain growth inhibitor may inhibit grain growth are considered below.

Accordingly, nanoparticle paste compositions of the present disclosure may comprise copper nanoparticles, and 0.01-15 wt. % of a grain growth inhibitor or a precursor to a grain growth inhibitor admixed with the copper nanoparticles, wherein the grain growth inhibitor comprises a metal. Suitable grain growth inhibitors are insoluble in a bulk copper matrix and are capable of residing at one or more grain boundaries in the bulk copper matrix. Suitable grain growth inhibitors comprising a metal are provided hereinbelow.

Figure 3A:
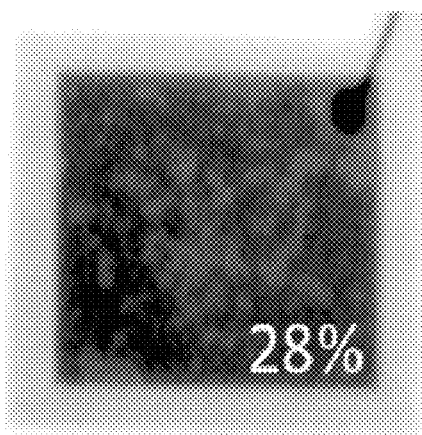
FIGS. 3A and 3B show X-ray images demonstrating the lack of large voids and overall decreased void area in consolidated copper nanoparticles (FIG. 3B) compared to AuSn solder (FIG. 3A).
Figure 3B:
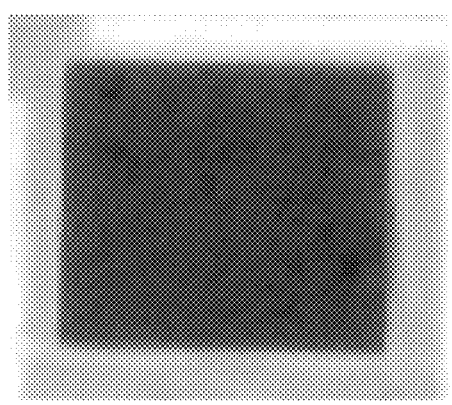

The copper nanoparticle paste compositions disclosed herein are advantageous over conventional solder materials and those based upon copper nanoparticles lacking a grain growth inhibitor. In particular, the copper nanoparticle paste compositions described herein offer a low processing temperature of around 200° C. that is gentle to a printed circuit board (PCB) and its components, reduces thermal stresses during heat-up and cool-down, prevents via blow ups and delamination, reduces warping of larger components and packaging systems, and allows high operating temperatures after the initial nanoparticle fusion has been completed due to the conversion of copper nanoparticles into a bulk copper matrix. Such nanoparticle paste compositions allow ready stacking of components and systems and multiple processing steps without the need to step down solder melting point and compromising overall reliability. As discussed above, when copper nanoparticles are heated above their fusion temperature, they convert to a bulk copper matrix and can be reheated to temperatures much above the original processing temperature without ill effects, unlike conventional solders. For example, a bulk copper matrix prepared from copper nanoparticles according to the present disclosure may afford a 100% increase in shear strength over 1000 hrs at 150° C. in air, while SAC solder may degrade significantly under the same conditions, losing over 50% of its original strength. The copper nanoparticle paste compositions described herein are readily dispensable, including dispensation amounts below 0.1 mg per step. Since the small amounts of additives and surfactants in the paste completely evaporate during fusion ("reflow"), no post-processing cleaning is required. One does not need to worry about flux residue, post cleaning and possible outgassing later on, conditions that could harm sensitive optical systems even under various space environments. Moreover, copper nanoparticles lack a liquid transition state, which eliminates wicking during processing allowing for very close spacing of components and leads/contacts. Connections formed from copper nanoparticles also have good green strength with a high sticking factor, thereby making it easy to handle assembled parts in a "wet" state. Moreover, copper nanoparticles retain their macro shape during fusion; they just harden to form a consolidated mass having a shape similar to that the unconsolidated metal nanoparticles following deposition. During consolidation, the metal matrix within the consolidated mass is characterized by a very fine, uniformly distributed nanoporosity (typically 4-15% with a pore size in the range of about 100 nm to about 300 nm, and mostly closed pores) that limits hot spots by ensuring uniform heat distribution across an interface. However, the nanoporosity may range from about 2% to about 15% (i.e., 85%-98% dense fused copper nanoparticles with closed pore nanoporosity with a pore size ranging from about 50 nm to about 500 nm, or about 100 nm to about 300 nm, or about 150 nm to about 250 nm). FIGS. 3A and 3B show X-ray images demonstrating the lack of large voids and overall decreased void area in consolidated copper nanoparticles (FIG. 3B) compared to AuSn solder (FIG. 3A). It can also alleviate thermal and mechanical stresses (plastic deformation).

Copper is further advantageous because it does not grow whiskers or dendrites and, therefore, can handle high electrical loads at high temperatures without causing shorts, thereby making it very robust. The toughness of copper prevents creep under such conditions, thereby making this metal a very reliable and dependable high temperature material. In addition, copper is widely available and much less toxic (an essential element for humans, animals and many plants) compared to most solders that contain lead, cadmium and other toxic components.

Copper also possesses good oxidation resistance, at least at ambient temperatures, due to its dense and well-adherent native $Cu_2O$ surface protection layer. Further enhancement of the oxidation resistance at elevated temperatures may be realized by alloying copper with Ni, Zn, Sn, P, Si, or Al, for example. Al and Si may be non-alloyed under alternate conditions and serve as a grain growth inhibitor, as discussed further below. With the inclusion of additional oxidation resistance, copper may be afforded high-temperature stability at temperatures up to about 90% of its melting point. The additional stabilizers for conveying oxidation resistance may be added to copper nanoparticles in the form of metal nanoparticles or micron-scale particles, in which case they may become incorporated in a bulk copper matrix following consolidation of the copper nanoparticles. The additional additives may also be added as an initial atomic level additive (such as a coating in core-shell nanoparticles or as a nanoparticle nucleus).

Suitable alloys with copper may be formed in situ by co-reduction/precipitation during the initial nanocopper formation process. In one configuration, the stabilizing atoms may be combined in the form of a metal salt and co-reduced with copper. In another configuration, the stabilizing atoms may be present as a metal organic compound that decomposes during the reduction to form copper nanoparticles. In still another configuration, the stabilizing atoms may be introduced as a compound added after the reduction step to form copper nanoparticles, with the compound being decomposed or reduced in a subsequent reduction step in the same reaction vessel. Finally, in still another configuration, a compound containing stabilizing atoms may be reduced or decomposed first prior to forming copper nanoparticles in the same reaction vessel. In this configuration, the stabilizing atoms may function as a nanoparticle nucleation seed to promote growth thereof.

Other oxidation protection can be afforded to copper nanoparticles using a variety of existing conformal coatings or solder mask materials like polyurethane, epoxy or parylene. These materials may be introduced over a bulk metal matrix formed after consolidating the copper nanoparticles with one another.

Improving the nanostructure of a metal or alloy may improve its toughness and strength while still allowing for significant deformation and elongation. The high number of grain boundaries in a nanostructured material formed from metal nanoparticles is associated with a large amount of energy present in these regions supporting ready grain growth even at relative low temperatures, thereby driving the system toward thermodynamic equilibrium and stability. To ensure high temperature stability over long periods of time and changing work environments, like thermal shock and cycling, preservation of the fine grain structure is needed. Grain structure preservation may be accomplished in the embodiments of the present disclosure by the addition of one or more grain growth inhibitors, which are materials that do not dissolve in the copper matrix but accumulate at the grain boundaries leading to domain pinning. According to some embodiments, suitable grain growth inhibitors are substances that are insoluble in bulk copper and are themselves foreign nanoparticles in the 10 nm and lower size range. Grain growth inhibitors comprising a metal, particularly metal nanoparticles having a size of about 10 nm or under, may be particularly desirable for inclusion in a bulk copper matrix. The small nanoparticle size allows the grain growth inhibitors to access the grain boundaries readily. Inclusion of the grain growth inhibitors limits grain growth by interface or Zener pinning and ensures that the nanograin structure is retained even after prolonged exposure to high temperatures, frequent temperature cycling and thermal shock. These actions prevent further atom diffusion and reorganization.

Without being bound by theory or mechanism, grain growth is believed to take place and be inhibited in accordance with the following mechanism. For a grain to grow, the grain boundary has to pass through any incoherent (nano)particle in the boundary region with the portion of boundary that would be inside the particle essentially ceasing to exist. In order to move past the (nano)particle, some new boundary must be created, and this is energetically unfavorable. Essentially bonds have to be broken and reformed. While the region of boundary near the particle is pinned, the rest of the boundary continues trying to move forward under its own driving force. This results in the boundary becoming bowed between those points where it is anchored (bonded) to the particles. An energy or activation barrier slowing grain growth is thereby created in the presence of a grain growth inhibitor. When enough of such pinning events occur, grain growth stops altogether.

Figure 4:
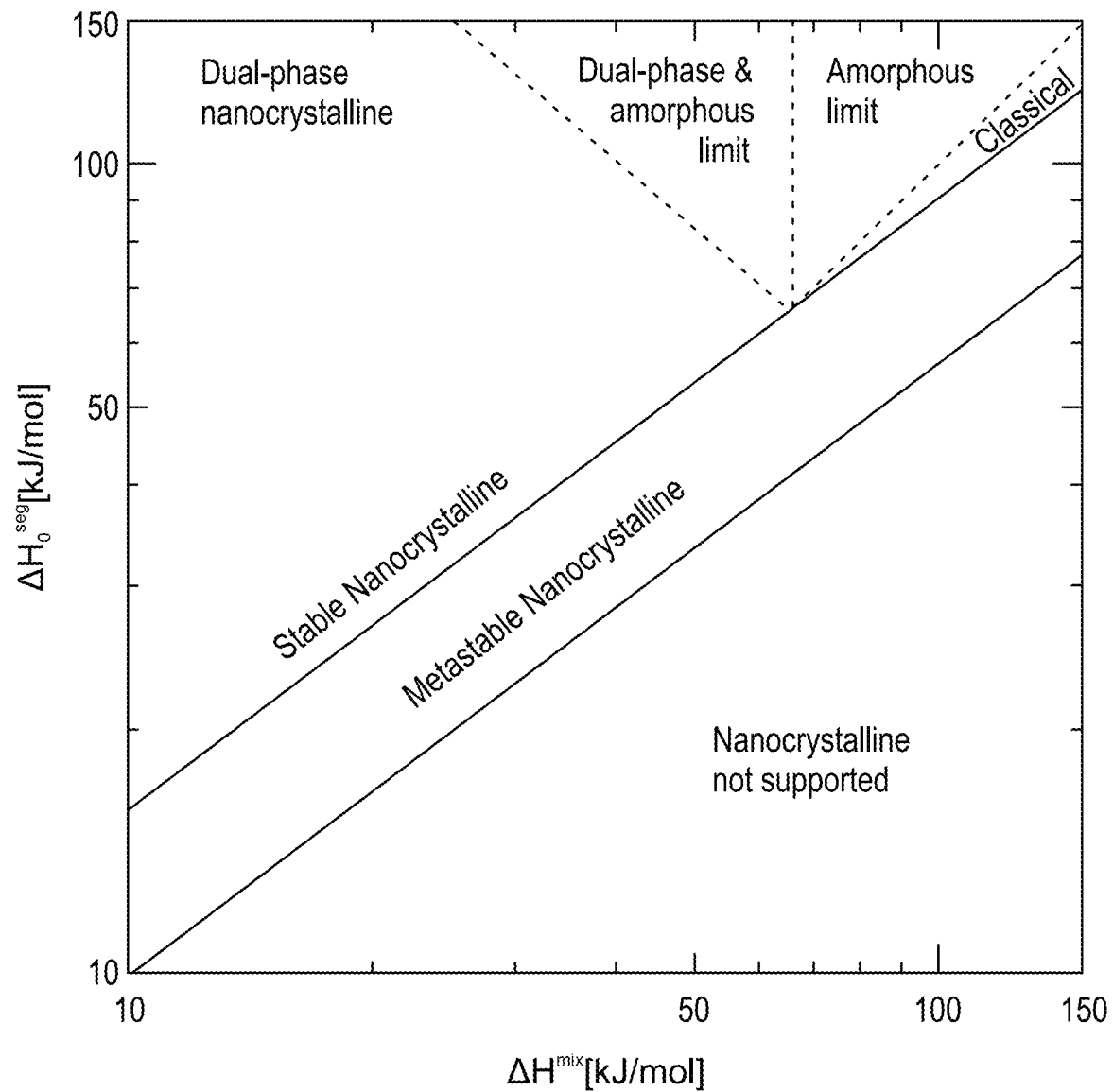
FIG. 4 shows a stability map of a nanostructured material calculated for a fixed dimensionless temperature.

If a material is too soluble in the copper matrix, it may not be an effective grain growth inhibitor. Namely, the material is incorporated into the overall matrix and does not pin the grain boundary. When the energy of mixing (solubility) is greater than the potential to separate at the grain boundary, the nanostructure is not stable and grain growth may occur ($\Delta H_o > \Delta H^{mix}$). FIG. 4 shows a phase plot of a typical nanostructured material and its stability regions.

Particle pinning pressure ($P_Z$) on a grain boundary can be $$P_Z = \frac{3f\gamma_0}{2r} \qquad \text{Formula 1}$$

estimated by Formula 1 where $\gamma_0$ is the surface energy, f and r is the volume fraction and radius of the precipitates respectively. This equation implies that precipitates of smaller size and large volume fraction are much more effective in pinning the grain boundaries than are larger particles at smaller volume fractions. Hall-Petch grain size strengthening may dominate in nanostructured copper alloys to high homologues temperature ~0.87 $T_m$ ($T_m$=melting point of bulk copper). Therefore, nanocopper can be stabilized to about a 940° C. operating temperature.

Similarly, if a potential grain growth inhibitor does not fit effectively within the grain boundaries, grain growth inhibition may be limited. Accordingly, particularly suitable grain growth inhibitors may be nanoparticles in certain instances, particularly metal nanoparticles that are about 10 nm or under in size.

Suitable grain growth inhibitors may include a metallic substance, a metal carbide, a metal nitride, a metal boride, a metal phosphide, or any combination thereof. Metal nanoparticles may be particularly suitable grain growth inhibitors. Particularly suitable grain growth inhibitors may include metal nanoparticles that do not undergo consolidation under the high-temperature operating conditions to which they are exposed.

According to particular embodiments of the present disclosure, suitable grain growth inhibitors may be metal nanoparticles that are insoluble in a bulk copper matrix. Suitable metals may include, for example, Fe, Mn, Cr, Co, Ru, Si, V, W, Nb, Ta, Y, Zr, Hf, Be, Tl, Ir, Ti, Mo, Re, Al or any combination thereof, including alloys thereof. Si is considered to be a metal for purposes of the present disclosure. Other suitable grain growth inhibitors may include, for example, carbides, nitrides, borides, silicides, or phosphides of the foregoing metals. Suitable borides may include, for example, Zr/Hf, V, or Nb/Ta. Similar metals may be appropriate for carbides, nitrides, silicides and phosphides, although any of the metals above may be suitable. Other suitable phosphides may include covalent phosphides such as BP and $SiP_2$, transition metal phosphides such as $Fe_3P$, $Fe_2P$, $Ni_2P$, CrP, MnP, MoP and the like. Metal-rich phosphides such as these may be desirable due to their water insolubility, electrical conductivity, high melting points, thermal stability, hardness, and similar properties. Other suitable carbides may include covalent carbides such as BC (including $B_xC_y$ non-stoichiometric carbides) and SiC, and transition metal carbides, which similarly exhibit high melting points, hardness, electrical conductivity, and similar properties. Graphene and other nanocarbon materials may also be effective grain growth inhibitors in some cases, depending on processing conditions.

Suitable grain growth inhibitors may be included in the copper nanoparticle paste compositions in an amount ranging between about 0.01 wt. % to about 15 wt. % with respect to the nanoparticle paste composition or a connection resulting therefrom following fusion of the copper nanoparticles to form a bulk copper matrix. In more particular embodiments, the grain growth inhibitors may be present in an amount ranging between about 0.01 wt. % and about 5 wt.

%, or between about 0.1 wt. % and about 0.5 wt. %. Particular copper nanoparticle paste compositions may comprise up to about 12 wt. % Al, or about 0.01-5 wt. % Zr, or about 0.01-5 wt. % Zr/Hf. These particular grain growth inhibitors in the referenced amounts may provide temperature stability of up to about 940° C., 500° C. or 600° C., respectively.

Al: Al may be introduced to the copper nanoparticles in several ways (discussed above) and function dually as a grain growth inhibitor and provide oxidation protection as well. Particular copper nanoparticle paste compositions may comprise up to about 12 wt. % Al, with the following stable insoluble polymorphic phases forming in the grain boundary regions under appropriate processing conditions: $AlCu_3$, $Al_4Cu_9$, AlCu, and/or $Al_2Cu$. The areal nanoparticle coverage with aluminum may be such that about 25%-75% of the copper atoms are exposed for undergoing surfactant evaporation. The insoluble Al/Cu compounds promote grain boundary pinning. About 5 atom percent of the copper atoms are covered by aluminum upon the surface of the copper nanoparticles. At higher amounts, Al alloys may result. Al may be incorporated in nanoparticle form, as micron size particles or flakes, or in a compound form that releases aluminum metal atoms before, during or after the main copper nanoparticle formation event. A partial shell of aluminum atoms on the copper nanoparticles may also be present, provided that an insoluble aluminum phase forms that is insoluble in the bulk copper. The distinct phases settle in the grain boundary region preventing further grain growth until the temperature exceeds about 940° C. Being the much lighter element (density: 2.7 $g/cm^3$), Al has the tendency to accumulate/stay at the surface of a denser nanoparticle like Cu (density: 8.92 $g/cm^3$).

Zr and Hf: The copper nanoparticle paste compositions may comprise up to or about 0.01-5 wt. % Zr, or 0.01-5 wt. % Zr/Hf. Zr forms stable polymorphs with the composition $Cu_5Zr$ and $CuZr_2$. A mixture of $Cu_9Zr_2$ and Cu forms with slight Zr impurities present. Hf may form similar compounds or different ones. These particular grain growth inhibitors in the referenced amounts may provide temperature stability of up to about 500° C. and 600° C., respectively.

Iron: Cu and Fe do not mix. No single-phase alloy is known to form at low temperatures. A solid mixture of these two elements comprises separate FCC Cu and BCC Fe phases, thereby fulfilling the requirement of an insoluble phase that accumulates in the grain boundary region.

Y and other metals: Y forms three stable polymorphs in the presence of copper under appropriate conditions: $Cu_5Y$, $Cu_2Y$, and CuY. These binary compounds can function as grain growth inhibitors. Tl, Mo, W, V, Nb, Co and Ir likewise do not form stable Cu alloys, and fully separated phases form. Ti forms the following stable binary compounds: $TiCu_3$, $Ti_3Cu_4$, TiCu, and $Ti_2Cu$. These insoluble titanium compounds can likewise inhibit grain growth.

Si: Si forms the stable polymorph $Cu_{15}Si_4$, which may inhibit grain growth.

Others: Mn forms a metastable $Cu_5Mn$ phase, which may inhibit grain growth. Cr and Be are slightly soluble in copper at 1-2%, but insoluble portions thereof may still inhibit grain growth at higher concentrations.

The grain growth inhibitors may be in various forms when incorporated/combined with the copper nanoparticles. In some embodiments, the grain growth inhibitors may be nanoparticles themselves, particularly having a size of about 10 nm or less. In other embodiments, the grain growth inhibitors may range between 10 nm and 100 nm in size.

When incorporated as nanoparticles, reagents for forming the grain growth inhibitors may be mixed with the reagents for forming the copper nanoparticles and then they may undergo co-reduction to form the copper nanoparticles and the grain growth inhibitors simultaneously. Suitable reagents for forming the grain growth inhibitors may include, for example, metal nitrates, chloride, bromides or iodides. The grain growth inhibitors may also constitute nanoparticle seeds for the copper nanoparticles, and then become incorporated within the copper matrix at grain boundaries formed following copper nanoparticle fusion. Nanoparticle seeds suitable for becoming a grain growth inhibitor may be made separately and combined with the reagents for forming the copper nanoparticles, or such nanoparticle seeds may be formed concurrently with forming the copper nanoparticles. Carrier solvents may be used to disperse the reagents for forming the nanoparticle seeds/grain growth inhibitors before dispersal with the copper nanoparticles or precursors to the copper nanoparticles.

Alternately, preformed grain growth inhibitors may be mixed with preformed copper nanoparticles, either before or after formulating the copper nanoparticles into a paste formulation.

In still other alternative embodiments, a trialkylaluminum compound (e.g., trimethylaluminum) may be incorporated in the copper nanoparticle paste formulations. The trialkylaluminum may react during copper nanoparticle consolidation to release aluminum or an aluminum compound into the grain boundaries. Additional general details on this process are provided above. The compound redAl may be used similarly to the trialkylaluminum compound.

Still further alternately, salts that form the grain growth inhibitors following reduction may be mixed within the copper nanoparticle paste formulations and then undergo reduction to form the grain growth inhibitors during consolidation of the copper nanoparticles. Carrier solvents may be used to promote mixing with the copper nanoparticle paste formulation.

In still other embodiments, $NaReO_4$ may be formulated into a grain growth inhibitor. This salt is compatible with both aqueous and non-aqueous solvent conditions (including glyme solvent mixtures) and the same amines that may be used in forming copper nanoparticles. Reducing agents such as $NaBH_4$, $CaH_2$, hydrazine, organomagnesium or organosodium compounds, or redAl may be used to affect reduction. In particular, $NaReO_4$ is dissolved together with the $CuCl_2$ and co-precipitated/reduced during the copper reduction step or can be predissolved and added as a solution after the initial copper reduction step.

Accordingly, the present disclosure also provides connections formed from copper nanoparticle paste compositions and methods for forming such connections. Suitable connections may comprise a bulk copper matrix formed through fusion of copper nanoparticles, in which the bulk copper matrix comprises a plurality of grain boundaries, and a grain growth inhibitor that is insoluble in the bulk copper matrix and is disposed within at least a portion of the plurality of grain boundaries within the bulk copper matrix, and in which the grain growth inhibitors comprise a metal. The grain growth inhibitors are present in an amount ranging from about 0.01-15 wt. % of the connection or a copper nanoparticle paste composition from which the connection is formed. As discussed above, the connection may be operationally stable at a temperature up to about 90% of the melting point of bulk copper.

Methods for forming the connections described herein may comprise depositing a nanoparticle paste composition comprising copper nanoparticles upon a substrate, and consolidating the copper nanoparticles to form a bulk copper matrix comprising a plurality of grain boundaries, in which the grain growth inhibitor is insoluble in the bulk copper matrix and resides within the plurality of grain boundaries in the bulk copper matrix. Consolidating the metal nanoparticles with one another may comprise applying pressure to the copper nanoparticles and/or heating the copper nanoparticles above their fusion temperature.

Embodiments disclosed herein include:

A. Nanoparticle paste compositions adapted for high-temperature use. The nanoparticle paste compositions comprise: copper nanoparticles; and 0.01-15 wt. % of a grain growth inhibitor or a precursor to a grain growth inhibitor admixed with the copper nanoparticles, the grain growth inhibitor comprising a metal; wherein the grain growth inhibitor is insoluble in a bulk copper matrix and is capable of residing at one or more grain boundaries in the bulk copper matrix.

A1. Nanoparticle paste compositions adapted for high-temperature use. The nanoparticle paste compositions comprise: copper nanoparticles; and a grain growth inhibitor or a precursor to a grain growth inhibitor admixed with the copper nanoparticles; wherein the grain growth inhibitor is insoluble in a bulk copper matrix and at least a portion of the grain growth inhibitor resides at one or more grain boundaries in the bulk copper matrix.

B. Connections suitable for high-temperature use. The connections comprise: a bulk copper matrix formed through fusion of copper nanoparticles, the bulk copper matrix comprising a plurality of grain boundaries; and a grain growth inhibitor that is insoluble in the bulk copper matrix and is disposed within at least a portion of the plurality of grain boundaries within the bulk copper matrix, the grain growth inhibitor comprising a metal in an amount ranging from about 0.01-15 wt. % of the connection.

B1. Connections suitable for high-temperature use and formed from the nanoparticle paste composition of A1.

C. Methods for forming a connection. The methods comprise: depositing a nanoparticle paste composition upon a substrate; wherein the nanoparticle paste composition comprises copper nanoparticles and 0.01-15 wt. % of a grain growth inhibitor or a precursor to a grain growth inhibitor admixed with the copper nanoparticles, the grain growth inhibitor comprising a metal; and consolidating the copper nanoparticles to form a bulk copper matrix comprising a plurality of grain boundaries, in which the grain growth inhibitor is insoluble in the bulk copper matrix and resides within the plurality of grain boundaries in the bulk copper matrix.

Embodiments A-C may have one or more of the following additional elements in any combination:

Element 1: wherein the grain growth inhibitor comprises a metallic substance, a metal carbide, a metal nitride, a metal boride, a metal silicide, a metal phosphide, or any combination thereof.

Element 2: wherein the grain growth inhibitor comprises a metallic substance, the metallic substance comprising a metal selected from the group consisting of Fe, Mn, Cr, Ru, Si, V, W, Nb, Ta, Y, Zr, Hf, Be, Tl, Ir, Ti, Mo, Re, Al, and any combination thereof.

Element 3: wherein the grain growth inhibitor comprises one or more metal nanoparticles.

Element 4: wherein the metal nanoparticles are about 10 nm or under in size.

Element 5: wherein the copper nanoparticles are about 20 nm or less in size.

Element 6: wherein the grain growth inhibitor is present as a seed within the copper nanoparticles.

Element 7: wherein the copper nanoparticles are coated with at least one amine surfactant.

Element 8: wherein the connection is operationally stable at a temperature up to about 90% of the melting point of bulk copper.

Element 9: wherein the method comprises exposing the connection to a temperature of about 150° C. or above up to a temperature of about 90% of the melting point of bulk copper.

By way of non-limiting example, exemplary combinations applicable to A-C include 1 and 3; 1, 3 and 4; 1 and 5; 1 and 6; 1 and 7; 2 and 3; 2-4; 2 and 5; 3 and 5; 2 and 6; 3 and 6; 5 and 6; 5 and 7; and 6 and 7, any of which may be present in further combination with 8 or 9 in B and C, or any of 1-7 may be singularly present in further combination with 8 or 9 in B and C.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the features of the present disclosure are presented herein. Not all features of a physical implementation are described or shown in this application for the sake of clarity. It is understood that in the development of a physical embodiment incorporating the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore evident that the particular illustrative embodiments disclosed above may be altered, combined, or modified and all such variations are considered within the scope and spirit of the present invention. The disclosure herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A nanoparticle paste composition comprising:
   30 to 97 wt. % copper nanoparticles;
   one or more organic solvents having a boiling point of about 100° C. or greater; and
   0.01-5 wt. % of a grain growth inhibitor admixed with the copper nanoparticles, wherein the grain growth inhibitor comprises a combination of Zr and Hf.

2. The nanoparticle paste composition of claim 1, wherein the copper nanoparticles are about 100 nm or less in size.

3. The nanoparticle paste composition of claim 1, wherein the copper nanoparticles are coated with at least one amine surfactant.

4. The nanoparticle paste composition of claim 1, wherein the nanoparticle paste composition comprises 0.1 to 10 wt. % of micron-scale metal particles.

5. The nanoparticle paste composition of claim 4, wherein the micron-scale metal particles are between about 500 nm and about 100 microns in size in at least one dimension.

6. The nanoparticle paste composition of claim 4, wherein the micron-scale metal particles comprise copper flakes.

7. The nanoparticle paste composition of claim 1, wherein:
   the copper nanoparticle paste composition is configured to form a bulk copper matrix at a temperature of 240° C. or less;
   the grain growth inhibitor is configured to preclude grain growth in the bulk copper matrix upon exposure to high operating temperatures of 300° C. or more.

8. The nanoparticle paste composition of claim 1, comprising about 50 to about 97 wt. % copper nanoparticles.

9. The nanoparticle paste composition of claim 1, wherein:
   the copper nanoparticle paste composition is configured to form a bulk copper matrix; and
   wherein the bulk copper matrix exhibits a 100% increase in sheer strength over 1000 hours at 150° C.

10. A method comprising:
    depositing the nanoparticle paste composition of claim 1 onto a substrate; and
    fusing the copper nanoparticles to form a bulk copper matrix comprising a plurality of grain boundaries;
    wherein the grain growth inhibitor is insoluble in the bulk copper matrix and resides within the plurality of grain boundaries in the bulk copper matrix; and
    wherein the copper nanoparticles fuse to form the bulk copper matrix at a temperature of 240° C. or less; and the grain growth inhibitor precludes grain growth in the bulk copper matrix upon exposure to high operating temperatures of 300° C. or more.

11. The method of claim 10, wherein grain growth inhibitor comprises a metallic substance, a metal carbide, a metal nitride, a metal boride, a metal silicide, a metal phosphide, or any combination thereof.

12. The method of claim 10, wherein the grain growth inhibitor is present as a seed within the copper nanoparticles.

13. The method of claim 10, wherein the copper nanoparticles are coated with at least one amine surfactant.

14. The method of claim 10, further comprising:
    exposing the connection to a temperature of about 150° C. or above up to a temperature of about 90% of the melting point of bulk copper.

15. A nanoparticle paste composition comprising:
    30 to 97 wt. % copper nanoparticles;
    one or more organic solvents having a boiling point of about 100° C. or greater; and
    0.01-15 wt. % of a grain growth inhibitor admixed with the copper nanoparticles, wherein the grain growth inhibitor comprises a trialkylaluminum compound.

* * * * *